Feb. 14, 1956  C. R. HARRISON  2,734,709
FRAMEWORK FOR CHRISTMAS TREE LIGHTING
Filed Aug. 20, 1953  2 Sheets-Sheet 1

Charles R. Harrison
INVENTOR.

BY *O'Brien*
*Harvey B. Jackson*
Attorneys

Feb. 14, 1956  C. R. HARRISON  2,734,709
FRAMEWORK FOR CHRISTMAS TREE LIGHTING
Filed Aug. 20, 1953  2 Sheets-Sheet 2
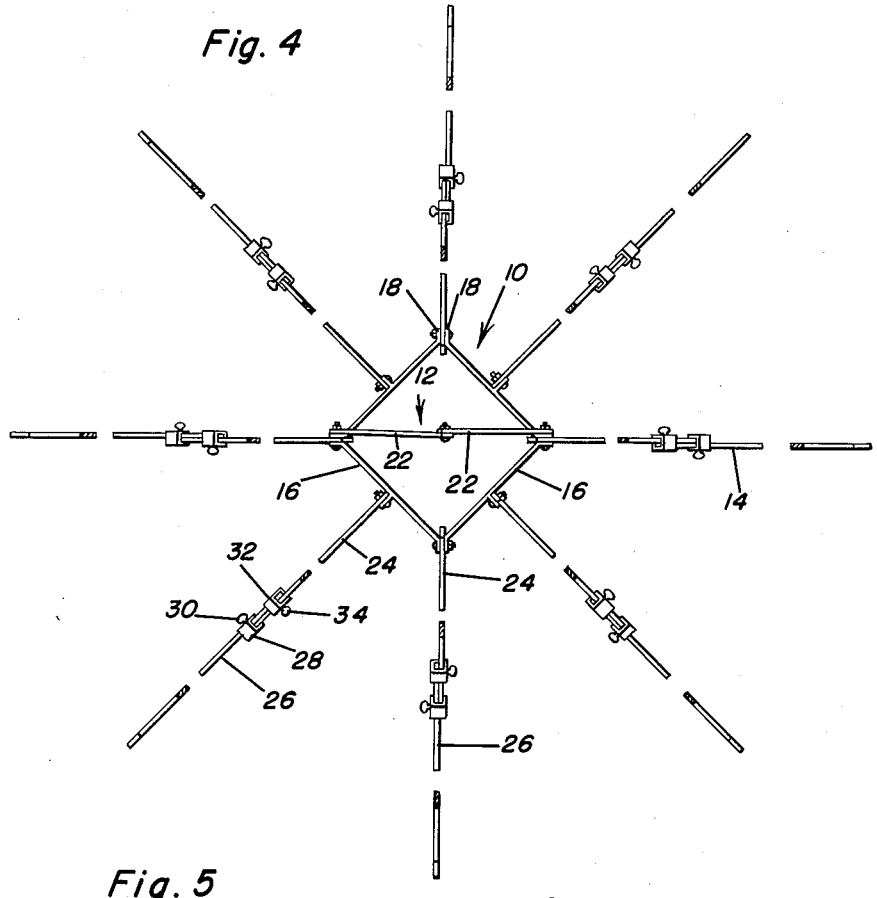
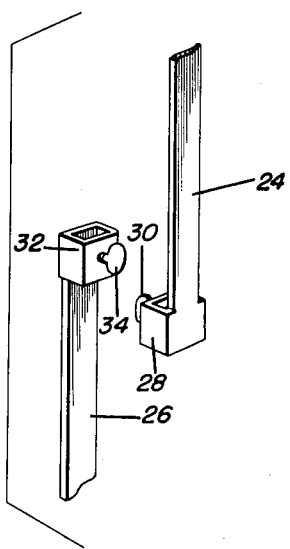
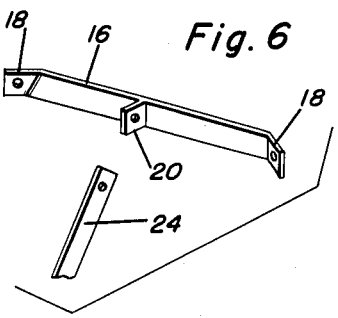
Charles R. Harrison
INVENTOR.

United States Patent Office 2,734,709
Patented Feb. 14, 1956

2,734,709
FRAMEWORK FOR CHRISTMAS TREE LIGHTING

Charles R. Harrison, Washington, Pa.

Application August 20, 1953, Serial No. 375,357

1 Claim. (Cl. 248—168)

This invention relates to a framework for Christmas three lighting, and more particularly to a framework which is adjustable to compensate for unevenness of the ground and height of the particular tree.

An object of this invention is to provide a framework for Christmas tree lighting which can be disassembled and thereby reduced to a small compact package convenient for handling and storage.

Another object of this invention is to provide a framework for Christmas tree lighting which is sturdy in construction, and durable and lasting in use.

A further object of this invention is to provide a framework for Christmas tree lighting wherein the legs are adjustable to compensate for unevenness of the ground and height of the tree.

A further object of this invention is to provide a framework for Christmas tree lighting to which the ordinary Christmas tree wiring, sockets and clips are attached.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a top view of the preferred form of the present invention;

Figure 5 is an exploded perspective view, showing the clamping means for adjusting the legs in detail; and, Figure 6 is an exploded perspective view, showing in detail the connection of the leg member to the crown member.

Figure 1:
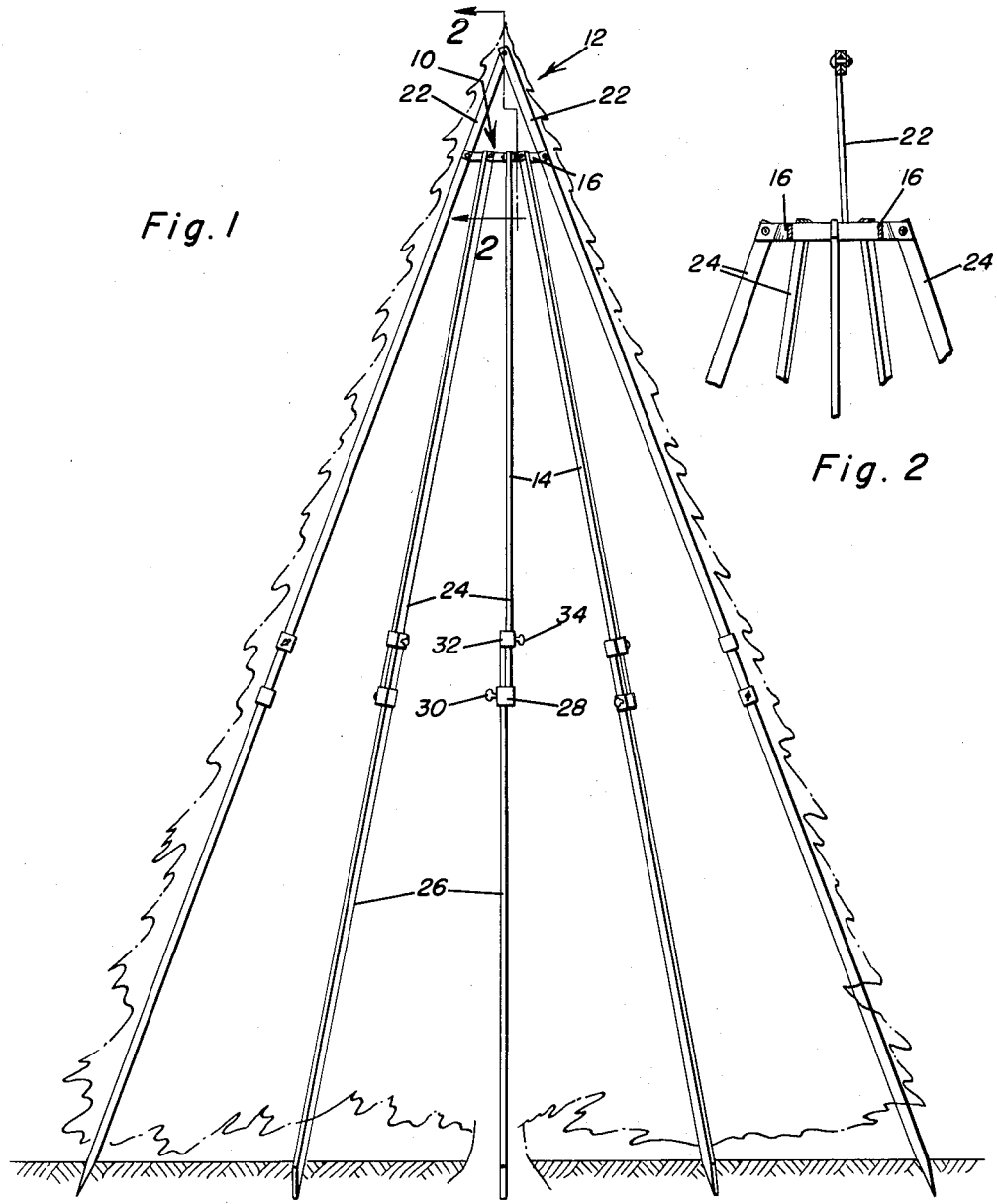
Figure 1 is a side elevational view of a preferred form of the present invention, showing the framework in conjunction with a tree.
Figure 2:
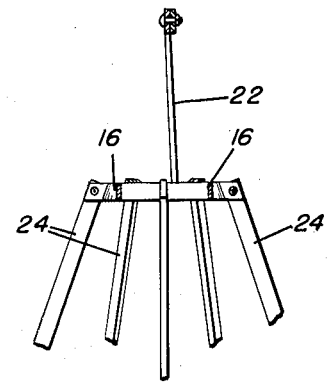
Figure 2 is a sectional view taken substantially along the section line 2—2 of Figure 1.

Referring now more specifically to the drawing it will be seen that the improved framework for Christmas tree lighting forming the subject of this invention includes, as shown in Figure 1, a crown member 10 having an upwardly extending mast 12 of inverted V-shape mounted thereon, and a plurality of pairs of opposite legs 14 extending downwardly from the crown member and arranged in octopodic relation.

The crown member 10 is formed of a plurality of longitudinal side members 16 joined in end to end relationship to form a rectangular frame structure. Each of the members 16 is provided with outwardly turned end 18 at the corners of the structure, with the outwardly turned ends of the members being opposed in pairs and adapted to be secured together to form the rectangular structure. An outwardly extending flange 20 is mounted at the mid-point of each of said members between the corners of said structure.

The mast member is formed of a pair of longitudinal members 22 pivotally secured together at the apex of the mast. The lower ends of members 22 are secured to outwardly extending ends 18 of members 16 at diagonally opposite corners on the crown member when in assembled position.

Each of the legs 14 comprises an upper member 24 and a lower member 26, slidably mounted on the upper member 24. The upper member 24 of alternate pairs are pivotally secured between opposed ends 18 of members 16 at the corners of the structure, while the upper members of the intermediate pairs are pivotally secured to the outwardly extending flanges 20 on members 16. Any suitable method, such as bolts having nuts thereon, can be used to secure the upper members 24 to the crown member 10. The lower end of members 24 is provided with a bracket 28. The bracket 28 is provided with an opening therethrough which slidably receives the lower member 26. The bracket 28 is further provided with a set screw thereon which engages member 26 in the opening within the bracket and thereby, when tightened against the member 26, locks the members 24 and 26 in adjusted position.

The upper end of lower member 26 is provided with a bracket 32 similar to bracket 28 and having an opening therethrough and a set screw 34. The upper member 24 is slidably received in the opening in the bracket 32 and set screw 34 engages the upper member 24 in a manner similar to the engagement of set screw 30 with member 26. There is thus provided an additional securing means for positioning the members 24 and 26 with respect to one another.

Figure 3:
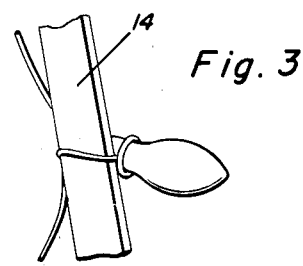
Figure 3 is a perspective view of one of the leg members of the framework, showing the mounting of a socket thereon in detail.

Figure 3 shows the mounting of a conventional socket having a clip thereon on a leg member 14. Any suitable means of fastening sockets which are not provided with clips can be used without departing from the scope of the present invention.

From the forgeoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A frame for Christmas tree lights comprising a rectangular horizontal frame structure including side members provided with outturned ends arranged in opposed pairs at the corners of the frame structure, said side members having outwardly extending flanges between said ends of said members, a mast of inverted V-shape rising from said frame structure and having longitudinal members with lower ends secured between diagonally opposite pairs of the outturned ends of the side members, and a plurality of pairs of opposite legs supporting said frame structure and arranged in octopodic relation, alternate pairs of legs being pivotally secured between pairs of outturned ends of the side members, and intermediate pairs of legs being pivotally secured to said flanges, the legs of one of the pairs being swingable on their pivots into alignment with the longitudinal members of the mast to form with said mast an inverted V-shaped structure in said frame.

References Cited in the file of this patent

UNITED STATES PATENTS

| | | |
|---|---|---|
| 347,927 | Esser | Aug. 24, 1886 |
| 1,286,391 | Neblett | Dec. 3, 1918 |
| 1,542,184 | Stoll | June 16, 1925 |
| 1,546,222 | Finaly | July 14, 1925 |
| 1,599,213 | Coupal | Sept. 7, 1926 |
| 2,265,479 | Goodman | Dec. 9, 1941 |